(12) United States Patent
Nakamura et al.

(10) Patent No.: US 8,326,875 B2
(45) Date of Patent: Dec. 4, 2012

(54) APPARATUS FOR PROCESSING INFORMATION AND A METHOD FOR SETTING ENVIRONMENT THEREOF

(75) Inventors: Yusaku Nakamura, Osaka (JP); Yasuko Teraoka, Osaka (JP)

(73) Assignee: Panasonic Corporation, Osaka (JP)

( * ) Notice: Subject to any disclaimer, the term of this patent is extended or adjusted under 35 U.S.C. 154(b) by 469 days.

(21) Appl. No.: 12/501,712

(22) Filed: Jul. 13, 2009

(65) Prior Publication Data

US 2010/0017411 A1    Jan. 21, 2010

(30) Foreign Application Priority Data

Jul. 14, 2008   (JP) ................................ 2008-182234

(51) Int. Cl.
   *G06F 17/30*   (2006.01)
(52) U.S. Cl. ............. 707/784; 707/783; 713/2; 713/188
(58) Field of Classification Search .................. None
   See application file for complete search history.

(56) References Cited

U.S. PATENT DOCUMENTS

| | | | |
|---|---|---|---|
| 2004/0107339 A1 | 6/2004 | Morisawa et al. | |
| 2004/0193929 A1 | 9/2004 | Kuranuki | |
| 2005/0044201 A1 | 2/2005 | Suzuki et al. | |
| 2006/0099937 A1 | 5/2006 | Helvick | |
| 2006/0099945 A1 | 5/2006 | Helvick | |
| 2007/0226399 A1 | 9/2007 | So et al. | |
| 2007/0275767 A1* | 11/2007 | Steele ........................ | 455/567 |

FOREIGN PATENT DOCUMENTS

| | | |
|---|---|---|
| EP | 1426851 | 6/2004 |
| JP | 2004-185050 | 7/2004 |
| JP | 2006-141024 | 6/2006 |

OTHER PUBLICATIONS

English language Abstract of JP 2004-185050, Jul. 2, 2004.
English language Abstract of JP 2006-141024, Jun. 1, 2006.

* cited by examiner

*Primary Examiner* — Anteneh Girma
(74) *Attorney, Agent, or Firm* — Greenblum & Bernstein, P.L.C.

(57) ABSTRACT

The invention provides an information processing apparatus and a system environment setting method thereof capable of changing over profiles flexibly and preventing failure to return to the original profile if the time zone desired to change over the profiles of the information processing apparatus is irregular or if the schedule is suddenly changed. The information processing apparatus of the invention includes a DB 230 for storing a plurality of profiles composed of data for setting the system environment, a profile changeover section 214 for reading out a specified profile from the DB 230 in order to change over the profiles, and setting the system environment, a user interface section 212 for receiving the continuation time of the profile being changed over, and a timer control section 211 for clocking the lapse of time after changeover of profiles, in which when the lapse of time has reached the continuation time of the profile, the profile changeover section 214 reads out the predetermined default profile from the DB 230, and sets the system environment.

13 Claims, 12 Drawing Sheets

Fig.4

| PLAN (PROFILE) | PRESENTATION | | HIGHEST ENERGY SAVING | | SHINKANSEN/AIRLINE | | ORDINARY | |
|---|---|---|---|---|---|---|---|---|
| | AC | DC | AC | DC | AC | DC | AC | DC |
| POWER SOURCE OF OPTICAL DISK DRIVE | 3 MINUTES OFF | 3 MINUTES OFF | OFF | OFF | 3 MINUTES OFF | 3 MINUTES OFF | 5 MINUTES OFF | 5 MINUTES OFF |
| BATTERY CHARGING MODE | 100% | | 100% | | 100% | | 80% | |
| NUMBER OF COLORS OF SCREEN | 32bit | 32bit | 16bit | 16bit | 32bit | 32bit | 16bit | 16bit |
| FAN CONTROL MODE | LOW SPEED | LOW SPEED | STANDARD | STANDARD | LOW SPEED | LOW SPEED | HIGH SPEED | HIGH SPEED |
| SCREEN SAVER | OFF | OFF | DO NOTHING | DO NOTHING | DO NOTHING | DO NOTHING | ON | ON |
| PLAN CONTINUATION TIME | 2H | 2H | 4H | 4H | 3H | 3H | ∞ | ∞ |

APPARATUS FOR PROCESSING INFORMATION AND A METHOD FOR SETTING ENVIRONMENT THEREOF

BACKGROUND ART

1. Field of the Invention

The present invention relates to an apparatus for processing information such as a notebook computer capable of setting a plurality of system environments, and a method for setting the environment of the system.

Recently, in information processing devices such as a FM or a notebook type personal computer (hereinafter called notebook computer), it is widely attempted to manage various items for setting the system environment (for example, control data for tuning off the monitor power source after a specific time, or tuning off the power source of the hard disk device) in batch by using a data file known as a profile. By using such profile, the user can change over the profile, and the system environment setting suited to the scene of using the notebook computer can be changed in batch, and the convenience of using the notebook computer can be enhanced. It has been also proposed to change the profile automatically according to a preset time zone (see, for example, Japanese Patent Application Laid-Open No. 2004-185050).

The method disclosed in Japanese Patent Application Laid-Open No. 2004-185050 is to change over to a predetermined eco mode or the like in a preset time zone, and this is an effective method when the time zone for changing over the profiles is determined.

2. Related Art

In the conventional method, however, if the time zone desired to change over the profiles is irregular, the time zone must be set every time the profiles are changed over, and it is not convenient. If the time can not be scheduled, it is also difficult to predict the time for changing over the profiles.

For example, when holding a meeting, we often experience that the conference starting tots or ending time is advanced or delayed. If changed over to a profile corresponding to the presentation at the meeting according to a predetermined starting time of the conference, in the case the meeting is started earlier than planned, in the conventional method, the profile is not changed over until reaching the preset time. If the profile is changed manually, the operation must be returned manually, and we may often forget to return manually.

The invention is devised to solve such problems, and it is hence an object thereof to present an apparatus for processing information and a method for setting environment thereof, capable of changing over the profiles flexibly if the profile changing time zone of the apparatus for setting information is not regular, or the conference schedule is changed frequently, and capable of preventing failure in returning to the original profile.

SUMMARY OF THE INVENTION

To achieve the object, the apparatus for processing information of the invention includes:

storing means for storing a plurality of profiles including the data for setting the system environment, input means for receiving a changeover instruction of profiles, and an input of continuation time of the profiles, by the user profile changeover means for reading out a corresponding profile, and setting the system environment by using the profile being read out, according to the profile changeover instruction, and time clocking means for clocking the lapse of time from setting of a new system environment by the profile changeover means, in which the profile changeover means reads out a default profile which is a profile preliminarily determined as a profile for resetting, from the storing means, when the lapse of time has reached the continuation time of the profile received through the input means, and sets the system environment anew by using the default profile being read out.

A method for setting a system environment of the invention is a setting method of system environment of an apparatus for processing information for setting the system environment, by storing a plurality of profiles composed of data for setting the system environment, and reading out the profile, including:

an input step of receiving data showing changeover of profiles, and an input of data showing continuation time of the changed-over profiles, a profile changeover step of reading out a corresponding profile, and setting the system environment by using the profile being read out, according to the profile changeover instruction, and a time clocking step of clocking the lapse of time from setting of a new system environment at the profile changeover step, and a profile returning step of reading out a default profile which is a profile preliminarily determined as a profile for resetting, from the plurality of stored profiles, when the lapse of time has reached the continuation time of the profile received at the input step, and setting the system environment anew by using the default profile being read out.

The invention therefore provides an apparatus for processing information capable of changing over the profiles flexibly if the profile changing time zone of the apparatus for processing information is not regular, or the schedule of the situation in utilizing the apparatus for setting information is changed frequently, and capable of preventing failure in returning to the original profile, and a method for setting the system environment thereof.

BRIEF DESCRIPTION OF DRAWINGS

FIG. 4 is a diagram showing examples of types of profiles and setting contents of individual profiles of the information processing apparatus in preferred embodiment 1 of the invention.

DETAIL DESCRIPTION OF THE INVENTION

Preferred embodiments of the invention are specifically described below while referring to the accompanying drawings.

Preferred Embodiment 1

1. Configuration of Information Processing Apparatus

Figure 1:
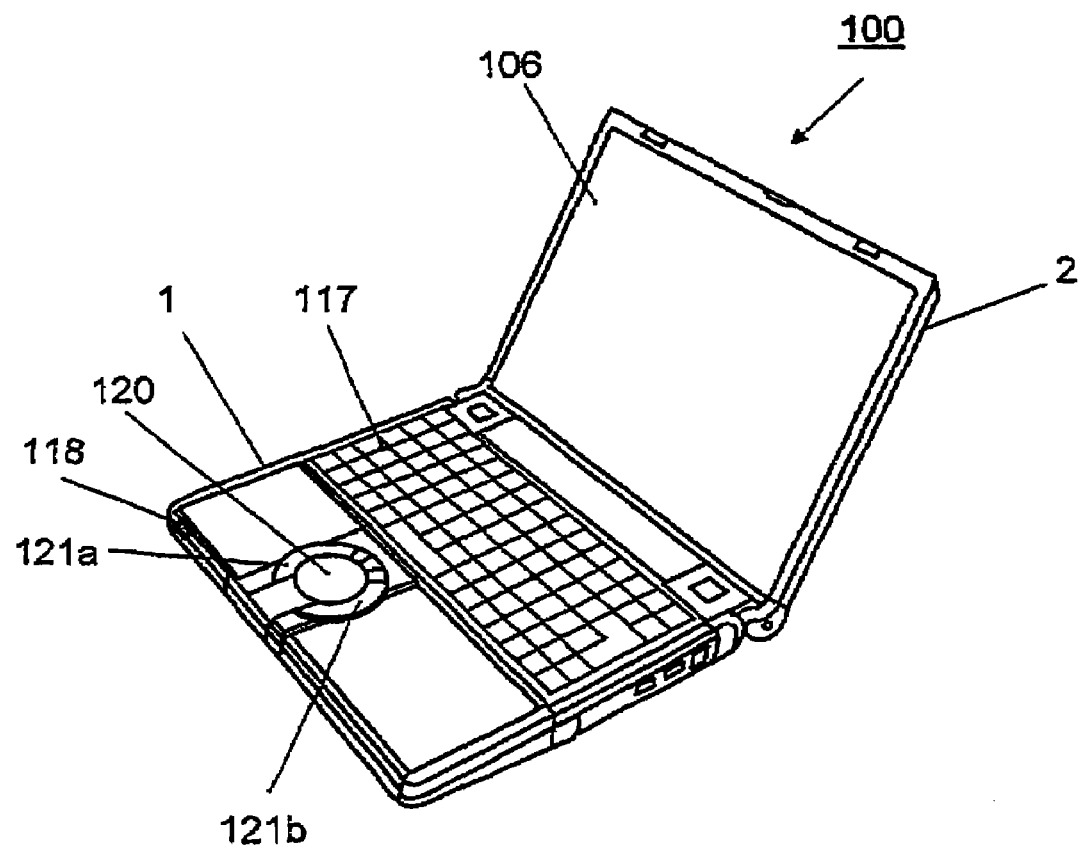
FIG. 1 is an outline diagram of an information processing apparatus (notebook computer) in preferred embodiment 1 of the invention.

Preferred embodiment 1 of the invention is explained by referring to FIG. 1 to FIG. 9. FIG. 1 is an outline diagram of an information processing apparatus (notebook computer) 100 in this preferred embodiment.

The information processing apparatus 100 is composed of a main body unit 1 and a lid unit 2, and principal components are contained in the main body unit 1, and a liquid crystal display 106 is attached to the lid unit 2. A keyboard 117 and a touch pad 120 for input are disposed on the top of the main body unit 1. At left and right sides of the touch pad 120, a left click button 121*a* and a right click button 121*b* are disposed (hereinafter called click button 121 if the side is not specified). The front side of the main body unit 1 is provided with an LED 118 for displaying the state of the power source or the like. Although not shown, terminals for AC adapter, terminals for network connection, and others are provided at the side surfaces of the main body unit 1.

Figure 2:
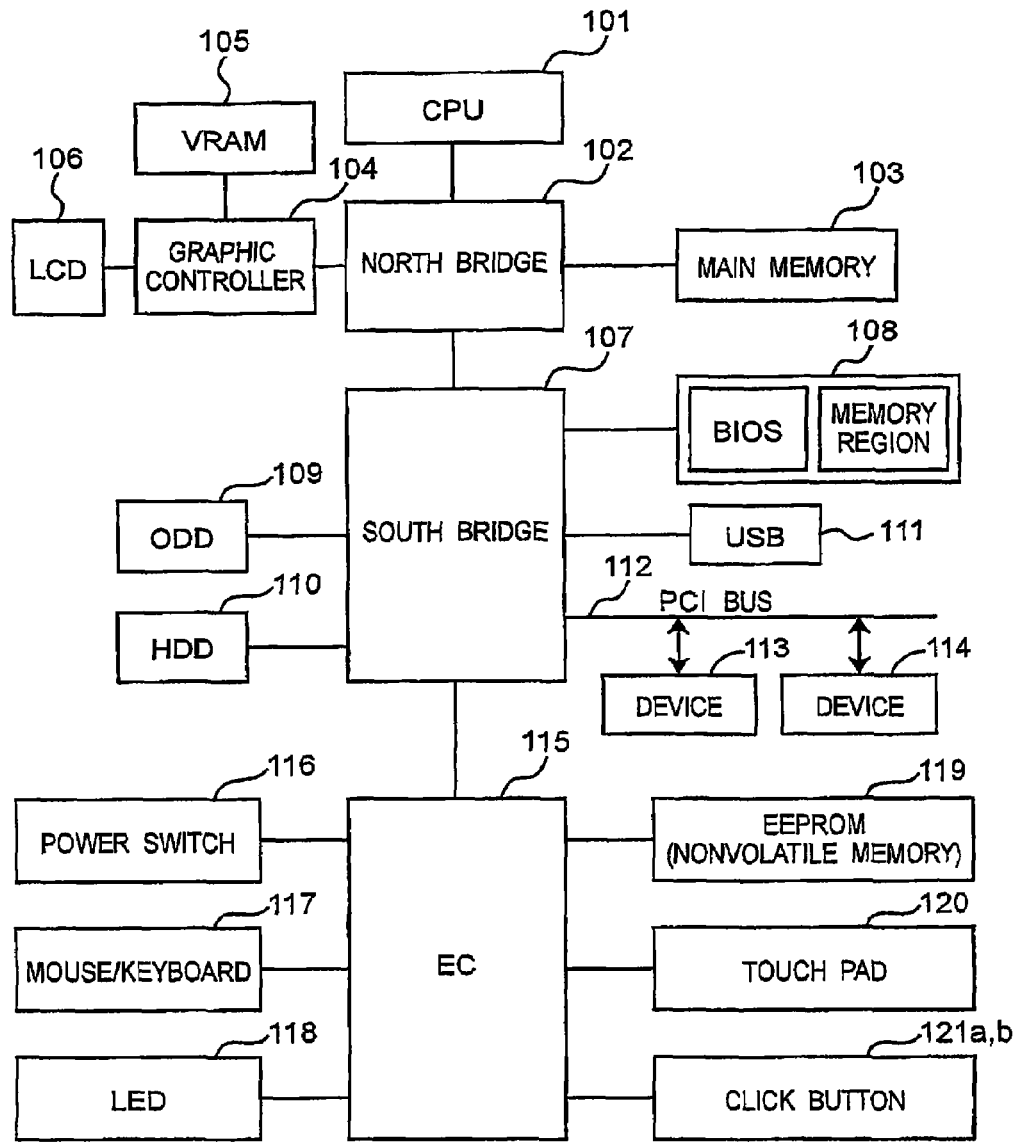
FIG. 2 is a block diagram of an electrical configuration of the information processing apparatus in preferred embodiment 1 of the invention.

FIG. 2 is a block diagram of an electrical configuration of the information processing apparatus 100 in this preferred embodiment.

The information processing apparatus 100 includes a CPU 101, a north bridge 102, a main memory 103, a graphic controller 104, a VRAM (video RAM) 105, an LCD (liquid crystal display) 106, a south bridge 107, a BIOS memory 108, an ODD (optical disk drive) 109, an HDD (hard disk drive) 110, a USB port 111, a PCI bus 112, PCI devices 113, 114, an EC (embedded controller) 115, a power switch 116, a mouse/keyboard 117, an LED 118, an EEPROM (nonvolatile memory) 119, a touch pad 120, and click buttons 121.

The CPU 101 is a processor for controlling the entire processing of the information processing apparatus 100, and executes the operating system (OS) and various application programs stored in the HDD 110 by loading into the main memory 103.

The north bridge 102 is one of the constituent elements of the chip set, and is connected to the CPU 101, and controls exchange of data with main memory 103, the PCI Express bus (for graphic), and the south bridge 107.

The graphic controller 104 converts the screen data written into the VRAM 105 by the OS/application program into a display signal, and outputs to the LCD 106.

The BIOS memory 108 is a nonvolatile flash memory, which stores the BIOS (basic input output system) or the system software for executing the initialization or control of the input and output hardware. It partly has a region capable of writing.

The south bridge 107 is one of the constituent elements of the chip set, and incorporates an IDE controller or S controller for controlling the ODD 109 and the HDD 110. The south bridge 107 also controls various external USB devices by way of the USB port 111, and communicates with the PCI devices 113, 114 connected to the PCI bus 112.

The EC 115 is a microcomputer, and controls to turn on and off the main power source (not shown) by the user's manipulation of the power switch 116. The EC 115 is also manipulated by the mouse/keyboard 117, touch pad 120, and click buttons 121, and transmits the operation content to the BIOS, and displays the states of power source and others in the LED 118 to inform the user. If the main power source of the main body is cut off, the EC 115 continues to work by receiving supply of power from a built-in battery or an AC adapter as an external power source.

The EEPROM (nonvolatile memory) 119 is connected to the EC 115, and various items of information are stored under the control of the EC 115.

2. Operation of Information Processing Apparatus

The information processing apparatus 100 of the preferred embodiment can change over the profiles, and allows the user to set the continuation time of the profile. When passing a preset duration time after the profiles are changed over, the information processing apparatus 100 displays a confirmation screen urging whether or not to return to the profile to the previous profile, and continues or restores the profile according to the user's instruction on the confirmation screen. Such changeover control of profiles is realized when the CPU 101 executes the profile change utility (software program). The changeover control of profiles of the information processing apparatus 100 is specifically described below.

As mentioned above, the "profile" in the specification refers to a data file for batch management of various items for setting the system environment of the information processing apparatus. In the specification, the "utilization plan" is a type of mode of utilization of the information processing apparatus, and the individual profiles are created in correspondence with the individual "utilization plans".

2.1 Setting about Changeover Control of Profiles

Figure 3:
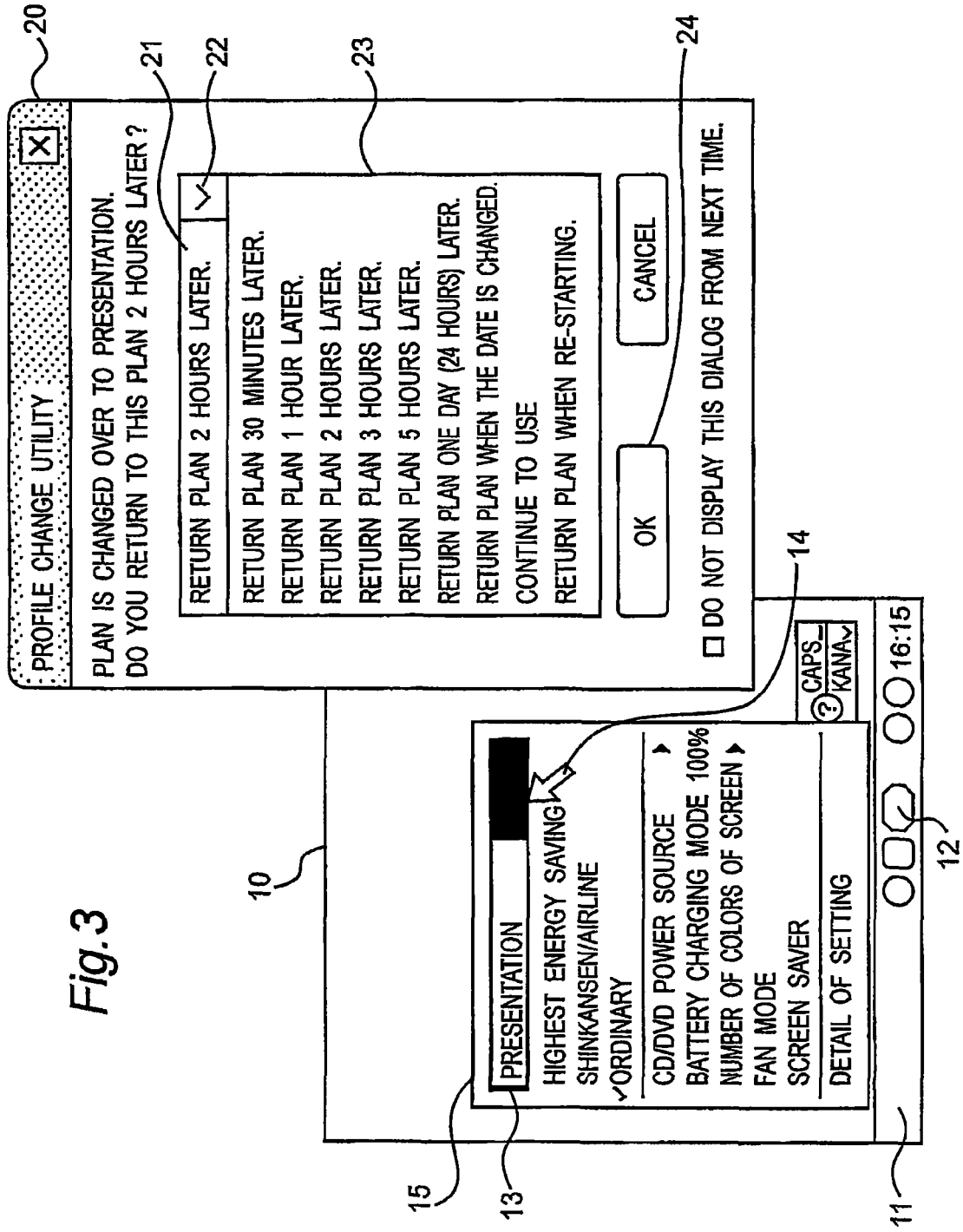
FIG. 3 is an explanatory diagram of changeover method of profiles and input method of continuation time of the changed-over profile of the information processing apparatus in preferred embodiment 1 of the invention.

Referring now to FIG. 3, the following is an explanation about setting method of changeover of profiles and setting method of duration continuation of changed-over files. FIG. 3 shows a window screen 10 and a profile change menu 15 displayed on the LCD 106. The user can change over the profiles by way of the window screen 10. The profile change menu 15 is a pop-up screen displayed by clicking the left click button 121*a* on the icon 12 of the profile change utility shown on the tool bar 11 of the window screen 10. The profile change menu 15 displays utilization plans corresponding to various modes of utilization of the information processing apparatus 100. When one utilization plan is selected by the user, the system environment (profile) corresponding to this utilization plan is set.

For example, when the user selects the "Presentation" plan 13 on the window screen 10 by moving the cursor 14 by the touch pad 120, the dialog screen 20 of the profile change utility pops up. When the user clicks the left click button 121a on the pull-down button 22, an input menu 23 for duration time in the "Presentation" plan is displayed. The continuation time is time until returning to the default profile (utilization plan) or the profile (utilization plan) before change after changing to a new profile (utilization plan). For example, in FIG. 3, choices are displayed as "return the plan 30 minutes later", "return the plan 1 hour later", "return the plan 2 hours later", "return the plan 3 hours later", "return the plan 5 hours later", "return the plan 1 day (24 hours) later", "return the plan when the date is changed", and "continue to use". These choices are based on the time. In addition, other choices based on a moment (or an event) such as "return the plan when re-starting" are also selectable.

For example, When the user selects to "return the plan 2 hours later", this message is displayed in the select menu display column 21. In this state, when the OK button 24 is clicked on with the left click button 121a, the continuation time of the presentation plan is set according to the selected item, and the dialog screen 20 is closed. By this setting, the profile of the information processing apparatus 100 is changed to a profile suited to the presentation, and 2 hours after the change, it is automatically returned to the default profile (for example, ordinary profile). If the user selects to "return the plan when re-starting", the setting of the presentation profile continues until the system is shut down, and only when the user restarts the information processing apparatus 100 next time, it is returned to the default profile. The continuation time sown in FIG. 3 is only an example, and it is not particularly specified. In another choice, for example, the restoring timing of the profile may be the finishing moment of the presentation application such as PowerPoint.

In the explanation above, after passing the continuation tine determined on the dialog screen 20 of the profile change utility, the profile is automatically returned to the preset default profile, but the profile change utility may be composed so that the user can change the default profile to return. For example, although not shown in the diagram, a menu for changing the default profile may be added to the dialog screen 20, and the OK button 24 may be clicked after change of the default profile to be returned. Or after passing the continuation time determined on the dialog screen 20 of the profile change utility, it may be designed to return automatically to the last one preceding profile).

Thus, the information processing apparatus 100 of the preferred embodiment is designed to allow the user to set changeover of profiles or set the continuation time of the profile by way of the window screen 10 and the dialog screen 20.

2.2 Example of Setting Contents of Profiles

FIG. 4 shows examples of types of profiles and setting contents of individual profiles of the information processing apparatus 100 in the preferred embodiment. In the examples in FIG. 4, assuming various scenes of using the information processing apparatus 100, profiles corresponding to four utilization plans are provided, that is, "presentation", "highest energy saving", "shinkansen/airline", and "ordinary". Each profile is divided into two profiles depending on the power supply system, Ac power (AC) or DC power (DC). Hence, a total of eight profiles can be selected. In each profile, system environment setting items are set, that is, "power source of optical disk drive", "battery charging mode", "number of colors of screen", "fan control mode", "screen saver", and "plan continuation time".

"Presentation" is a profile for offering an optimum setting for use of the information processing apparatus 100 in presentation at a conference or the like. "Highest energy saving" is a profile for offering an optimum setting for operating the information processing apparatus 100 so as to save the energy consumption to maximum. "Shinkansen/airline" is a profile for offering an optimum setting for use of the information processing apparatus 100 in transportation medium such as bullet train or airplane. "Ordinary" is a profile for offering an optimum setting for use of the information processing apparatus 100 in ordinary operation.

The item of "power source of optical disk drive" is for setting whether to turn on or not the power source of the disk drive after starting the main power source of the information processing apparatus 100. The item of "power source of optical disk drive" is also for setting a specified time when turning off the power source of the disk drive when the disk drive is not used for the specified time. For example, it is set as "OFF" in the utilization plan (profile) of "highest energy saving". In this setting, when starting the main power source of the information processing apparatus 100, the power source of the disk drive is not turned on. In the utilization plan of "presentation" or the like, it is set at "3 minutes OFF". In this setting, when starting the main power source of the information processing apparatus 100, the power source of the disk drive is turned on, but if the medium such as CD or DVD is not loaded within 3 minutes after turning on the power, the power source of the disk drive is turned off. In the case of such presentation, the specified time is set at, for example, 3 minutes if reproduction of the media is assumed after starting the main power source of the information processing apparatus 100.

The item of "battery charging mod" is for setting 100% charging mode or 80% charging mode. Generally, when the battery is not used for a long time after 100% charging, the battery life is shortened, and the personal computer and other appliances are provided with a special charging mode for stopping charging at about 80% so as not to shorten the battery life. For example, in the utilization plan of "presentation" or "shinkansen/airline", since use of battery (DC power source) for a long time is assumed, it is set at 100% charging mode. On the other hand, in the utilization plan of "ordinary" or the like, since use of AC power source is assumed, it is set at 80% charging mode.

The item of "number of colors of screen" is for setting the number of display colors of the LCD 106. The setting is either "16 bits" for displaying 65,536 colors, or "32 bits" for displaying 16,777,216 colors. For example, in the case of utilization plan (profile) of "presentation", since various expressions may be required, the setting is "32 bits", and in the case of utilization plan (profile) of highest energy saving," the setting is "16 bits".

The item of "fan control mode" is for setting the speed of the CPU cooling fan. Depending on the rotation speed of the fan, three modes are set, "standard", "low speed", and "high speed". For example, in the case of utilization plan (profile) of "presentation", it is assumed to be used in a conference room controlled by an air conditioner. In addition, a quiet operation is demanded in presentation. Therefore, the item of "fan control mode" in the utilization plan (profile) of "presentation" is set at "low speed". In the utilization plan (profile) of "ordinary", since the use in high temperature state or use of AC power source is assumed, the "fan control mode" is set at "high speed".

The item of "screen saver" is for setting whether to operate ("ON") the screen saver or not ("OFF"). If an operation of the screen saver in the midst of a presentation is not desired, as when the utilization plan (profile) of "presentation" is used, it is set at "OFF", and when it is assumed that the personal computer, once started up, may not be used for a long time such as the case of the utilization plan (profile) of "ordinary", it is set at "ON".

The item of "plan continuation time" is for setting the continuation time until retuning to the default profile after changing over to each profile. As mentioned above, basically, the continuation time is set on the dialog screen 20 of the profile is change utility shown in FIG. 3. However, if a continuation time is not determined on this screen, the time set in the item of "plan continuation time" is the continuation time until returning. Either specified time or "indefinite time (∞)" is set. The "indefinite time (∞)" means that the profile continues unless the user change over the profiles. For example, in the utilization plan (profile) of "presentation", 2 hours is set, in the utilization plan (profile) of "shinkansen/airline", 3 hours is set, and in the utilization plan (profile) of "ordinary", indefinite time (∞) is set.

Although not shown in FIG. 4, the system environment setting items of the profiles may also include change of screen refreshing rate, on/off of power saving mode of video driver, on/off mode of power saving mode of sound drive, etc.

2.3 Profile Changeover Control

Figure 5:
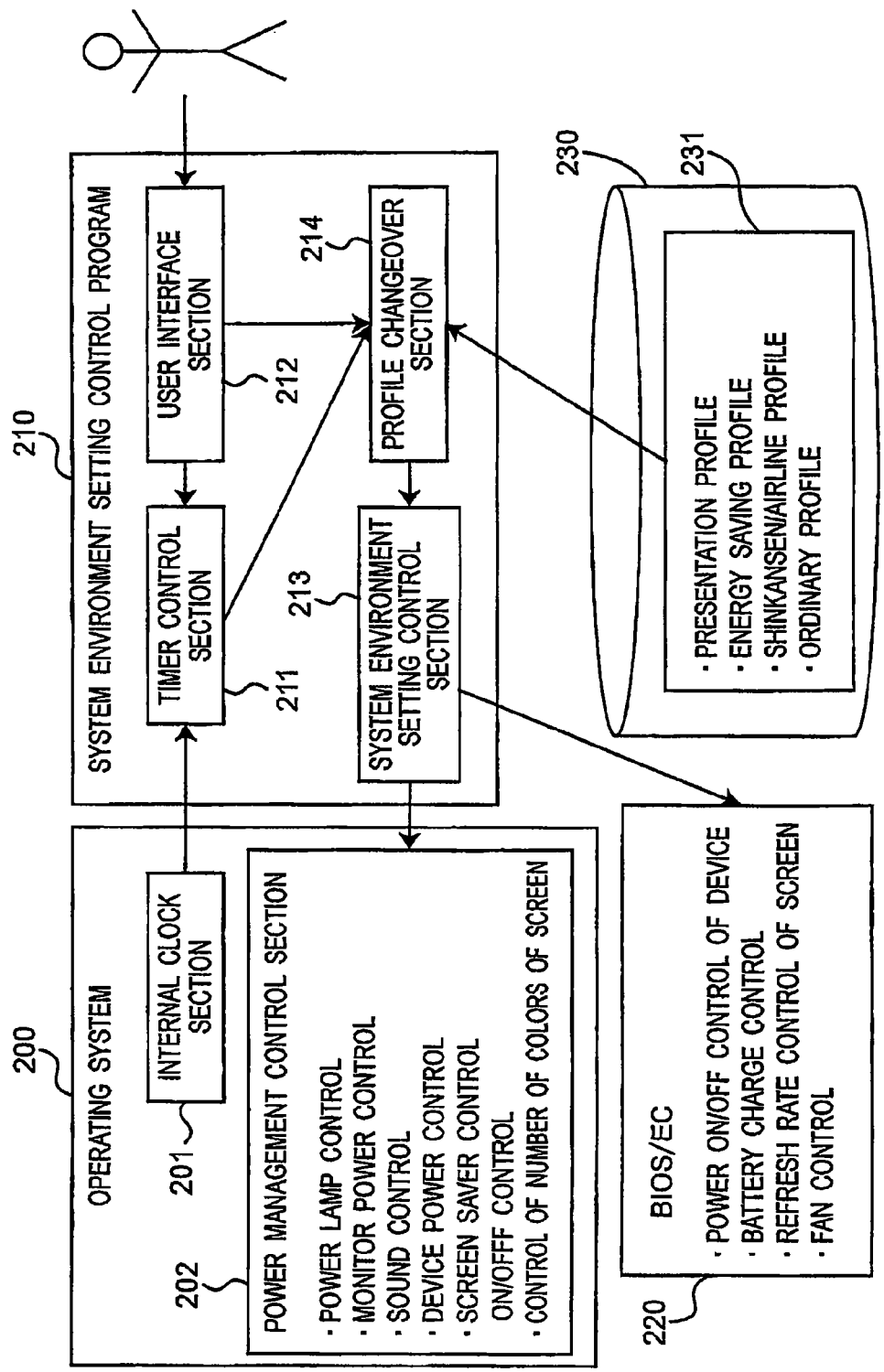
FIG. 5 is a functional block diagram mainly showing the software relating to changeover control of system environment setting of the information processing apparatus in preferred embodiment 1 of the invention.

Referring now to FIG. 5, the changeover control of profiles of the information processing apparatus 100 in the preferred embodiment is explained. FIG. 5 is functional block diagram of software relating to changeover control of system environment setting of the information processing apparatus 100.

The software of the information processing apparatus 100 is composed of an OS (operating system) 200, a system environment setting control program (profile change utility) 210, a BIOS/EC 220, and a DB (database) 230 for storing system environment setting data 231 corresponding to each profile.

The OS 200 has an internal clock section 201 for managing the time in the system, and also a power management control section 202. The power management control section 202 receives system environment setting data from a system environment setting control section 213 described below, and executes power lamp control, monitor power control, sound control, device power control, and screen saver on/off control, and controls the power source in various aspects so as to extend the operating time of the battery (DC power) as long as possible. The OS 200 also controls the number of colors of the screen. Since the internal clock section 201 continues to operate by the battery if the main power source of the information processing apparatus 100 is turned off, the continuation time of the profile is managed correctly if the main power source is turned off.

The DB 230 stores the setting data about each one of the system environment setting items corresponding to four profiles of "presentation", "highest energy saving", "shinkansen/airline", and "ordinary" of the information processing apparatus 100.

The system environment setting control program (profile change utility) 210 includes a timer control section 211, a user interface section 212, a system environment setting control section 213, and a profile changeover section 214. The user interface section 212 receives user's starting instruction of the profile change utility, and displays the profile change menu 15 and the dialog screen 20 for receiving the continuation time of profile on the LCD 106. The user interface section 212 transmits the information of the profile changed by the user to the profile change section 214, or transmits the continuation time information of the profile entered by the user to the timer control section 211. The timer control section 211 acquires the time from the internal clock section 201 of the OS 200, and acquires the continuation time information of the profile entered by the user from the user interface section 212, and instructs the timing for returning to the default profile to the profile change section 214. The profile change section 214 receives instructions from the user interface section 212 and the time control section 211, and reads out the system environment setting data corresponding to the changed profile from the DB 230, and sends out to the system environment setting control section 213.

The BIOS/EC 220 receives the system environment setting data from the system environment setting control section 213, and controls the system environment of the corresponding device.

Figure 6:
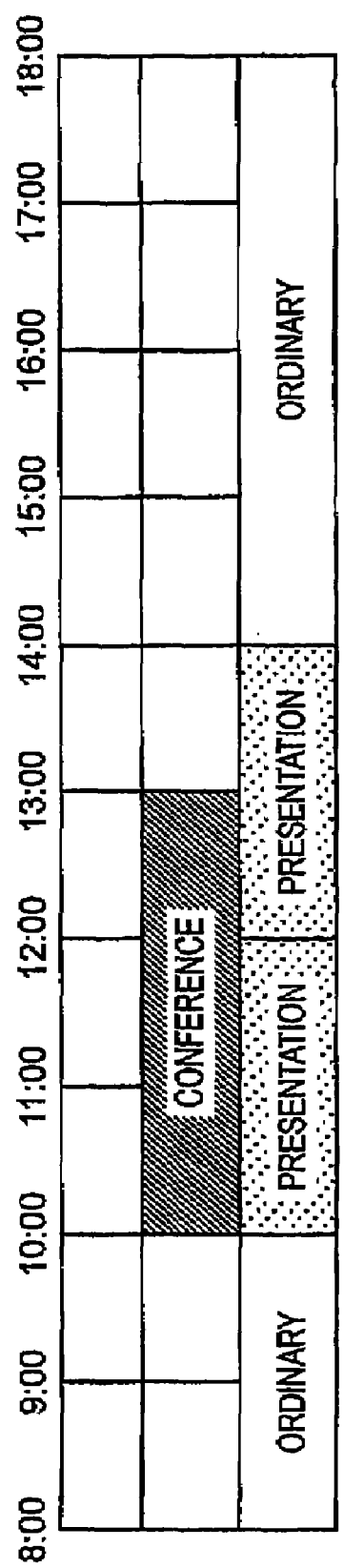
FIG. 6 is a diagram of changeover example of profiles of the information processing apparatus in preferred embodiment 1 of the invention.
Figure 7:
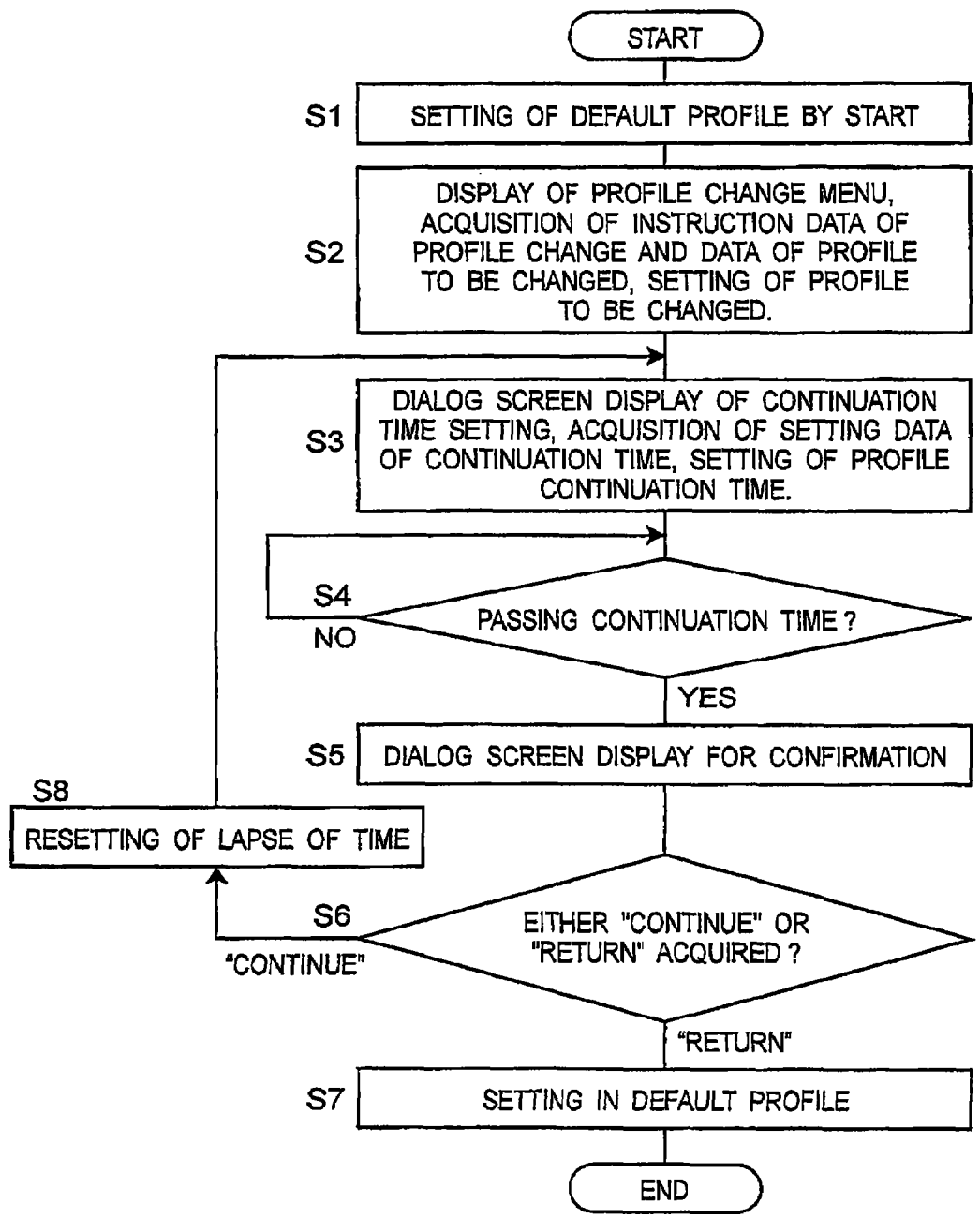
FIG. 7 is a flowchart of operating procedure of the information processing apparatus in preferred embodiment 1 of the invention.
Figure 8:
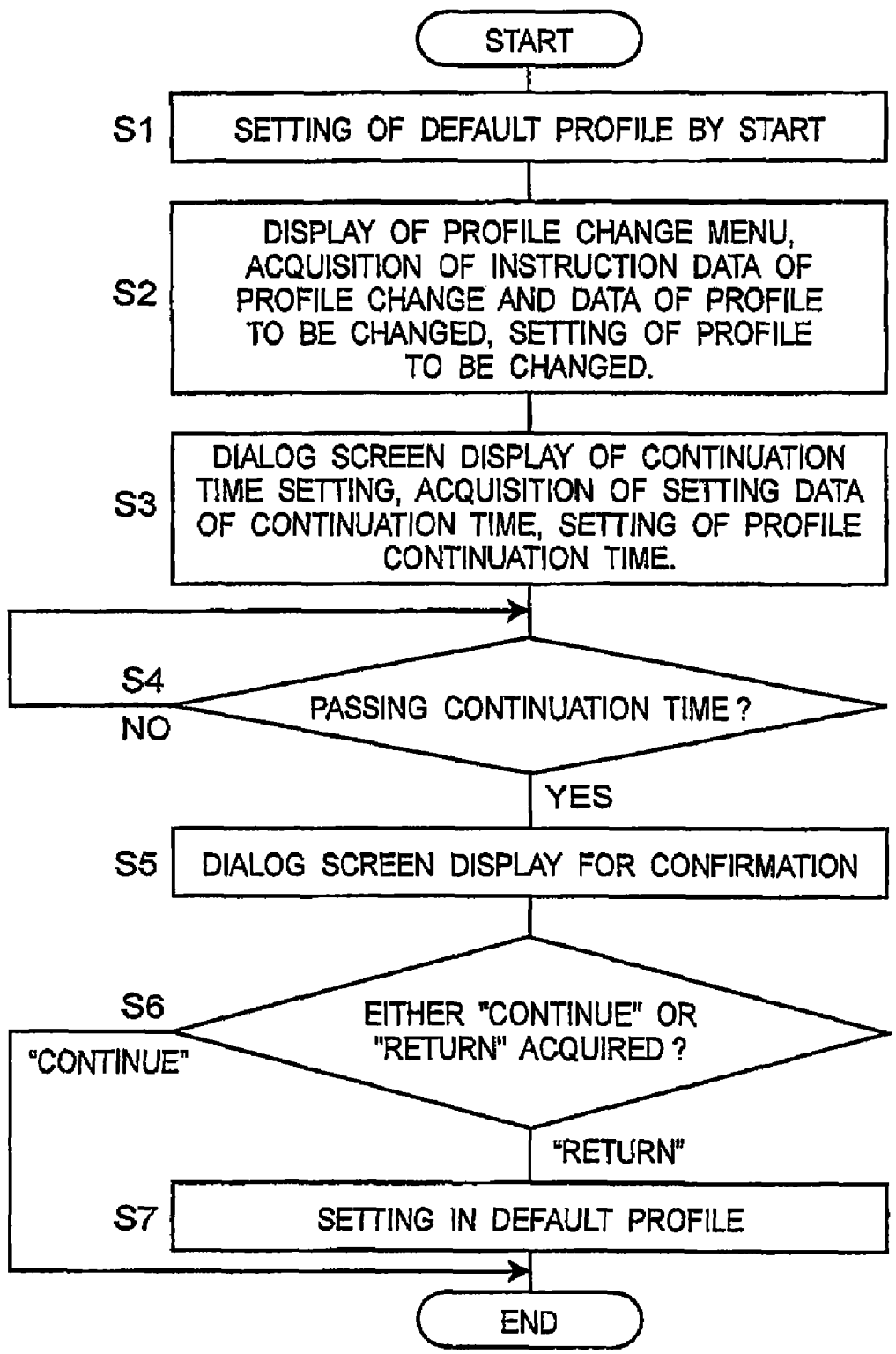
FIG. 8 is a flowchart of operating procedure of the information processing apparatus in preferred embodiment 1 of the invention.
Figure 9:
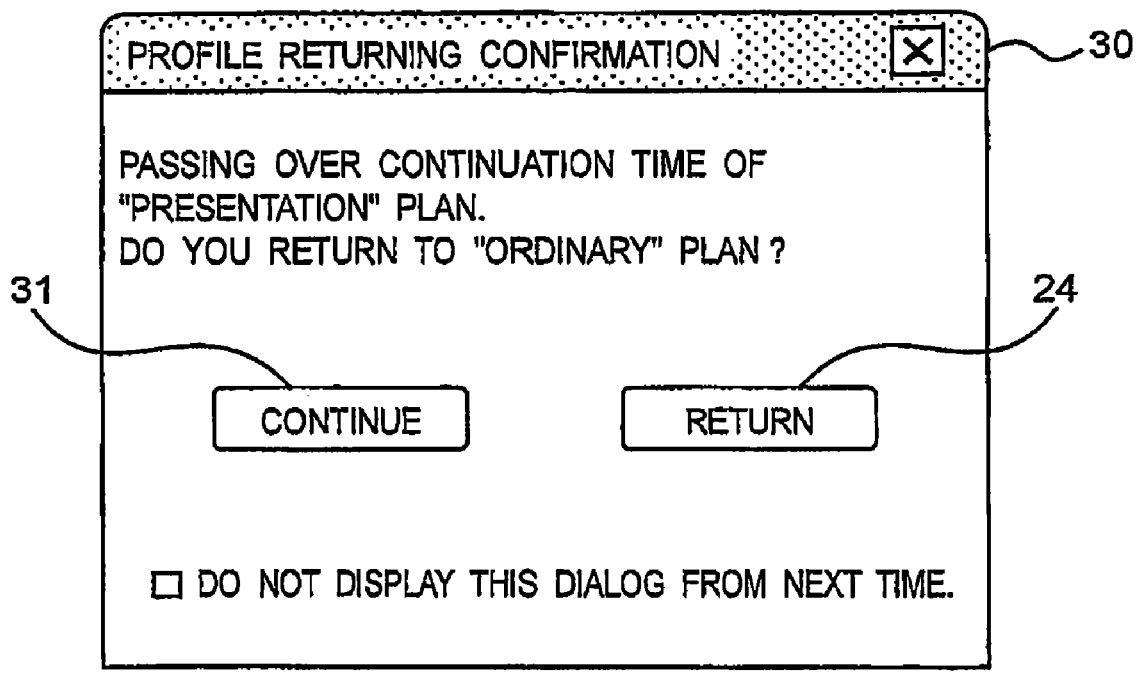
FIG. 9 is a diagram showing an example of dialog screen of confirmation of continuation of profiles of the information processing apparatus in preferred embodiment 1 of the invention.

Referring now to FIG. 6 to FIG. 9, the detail of profile changeover control of the preferred embodiment is explained. FIG. 6 is a diagram showing a changeover example of profiles of the preferred embodiment. FIG. 7 and FIG. 8 are flowcharts of operating procedure of the information processing apparatus 100 at this time. FIG. 9 is a diagram of an example of dialog screen 30 for confirming the restoration of the profile.

For example, assuming a case of a conference originally scheduled from 10:00 to 12:00 postponed to 13:00, the flow of profile changeover process is explained by referring to FIG. 6 and FIG. 7.

Suppose the default setting of the profile to be "ordinary". When the information processing apparatus 100 is started, the system environment is first set to the "ordinary" profile according to the default setting (S1). Immediately before the conference begins at 10:00, if the user starts the profile change utility, the profile changeover menu 15 is displayed. On the profile changeover menu 15, the user selects the "presentation" as the utilization plan (profile). On the basis of the user's selection operation, according to the above procedure, the profile changeover section 214 changes the utilization plan to "presentation" (S2) and sets it. Specifically, the profile changeover section 214 acquires the data instructing the profile changeover and the data showing that the profile after changeover are "presentation", reads out the system environment setting data corresponding to the "presentation" profile from the DB 230, and transmits the data to the system environment setting control section 213. The system environment setting control section 213 controls the system environment of the related devices by way of the OS 200 and the BIOS/EC 220 according to the received system environment setting data.

Further, on the dialog screen 20 displayed for setting the continuation time of the utilization plan (profile), the user sets the continuation time of the utilization plan (profile) at 2 hours. The user interface section 212 acquires "2 hours" as the setting data of the continuation time. According to the user's setting operation, the timer control section 211 sets the continuation time at 2 hours, and starts the timer operation (S3). Then, the timer control section 211 checks the time of the internal clock section 201 of the OS 200, and judges whether the preset continuation time (2 hours) has passed or not (step S4) If the continuation time has not been passed (No), the judging step is repeated (step S4).

When the present time reaches at 12:00, passing the specified continuation time (2 hours) from the moment of profile changeover (Yes at step S4), the user interface section 212 displays the dialog screen 30 for allowing the user to confirm returning of the profile (S5). FIG. 9 shows an example of the dialog screen 30 displayed for allowing the user to confirm returning of the profile. The dialog screen 30 is a screen for allowing the user to determine whether to continue the present profile or to return to the default profile. In the example shown in FIG. 6, since the conference is not over yet at 12:00, the user clicks the Continue button 31 ("Continue"

at step S6). As a result, the control is shifted to step S8. At step S8, the timer control section 211 resets the timer. Returning to step S3, the flow after S3 is repeated.

At 14:00, again, the dialog screen 30 is displayed at step S5, and it is confirmed whether to continue the present profile or to return to the default profile. At 14:00, since the conference is over, the user clicks the Return button 32 ("Return" at step S6). By this user's operation, the profile changeover section 214 reads out the system environment setting data corresponding to the "ordinary" profile (which is the default profile) from the DB 230, and sends out to the system environment setting control section 213. The system environment setting control section 213 controls to return the system environment of the related devices to the original state by way of the OS 200 and the BIOS/EC 220 (S7).

In the flowchart in FIG. 7, when "Continue" is selected at step S6, transferring from step S8 to step S3, it is designed that the continuation time of the "presentation" profile may be set by the user again. However, as shown in the flowcart in FIG. 8, it may be designed not to set the continuation tine of the profile again. In this case, the present "presentation" profile continues (that is, if "Continue" is selected at step S6, the setting of the present "presentation" profile continues). In FIG. 8, in other steps, the control is same as in FIG. 7 and the same explanation is omitted.

In the foregoing explanation, when the Return button 32 on the dialog screen 30 is clicked, the profile is returned to the preset default profile Instead, the default profile to return may be changed externally by way of the user interface section 212. Although not shown in the diagram, a menu changing the default profile may be added to the dialog screen 30. In this case, after changing the default program to return, the Return button 32 is clicked.

At step S5, when the dialog screen 30 is displayed, the user capable of manipulating the screen may not be always positioned at the side of the information processing apparatus 100, or the user may not be ready to manipulate due to some reason. In such a case, it may be designed that the dialog screen 30 may be automatically closed to return to setting of the default profile if the dialog screen 30 is not manipulated from outside for a specified time. Or, in such a case, it may be designed to continue the present profile.

On the dialog screen 30 displayed for allowing the user to confirm returning of the profile (S5 in FIG. 7, FIG. 8), the user manipulates and decides whether to continue the present profile, or to return to the default profile, but the dialog screen 30 may be provided with a choice button for "returning to the preceding profile". When the user manipulates and clicks this choice button, the profile changeover section 214 reads out the system environment setting data corresponding to the preceding (last one) profile from the DB 230, and sends the data to the system environment setting control section 213. The system environment setting control section 213 controls to return the system environment of the related device to the preceding one by way of the OS 200 and the BIOS/EC 220.

As explained herein, according the preferred embodiment, whenever necessary, the user can change over the utilization plans manually, and can change over to the profile of the system environment most suited to this utilization plan. At this time, the continuation time of the profile until returning to the preceding profile can be set, and the user can confirm whether or not to return to the preceding profile at the time of reaching the specified continuation tine. Hence, failure of the user to return the profile may be prevented.

Preferred Embodiment 2

Figure 10:
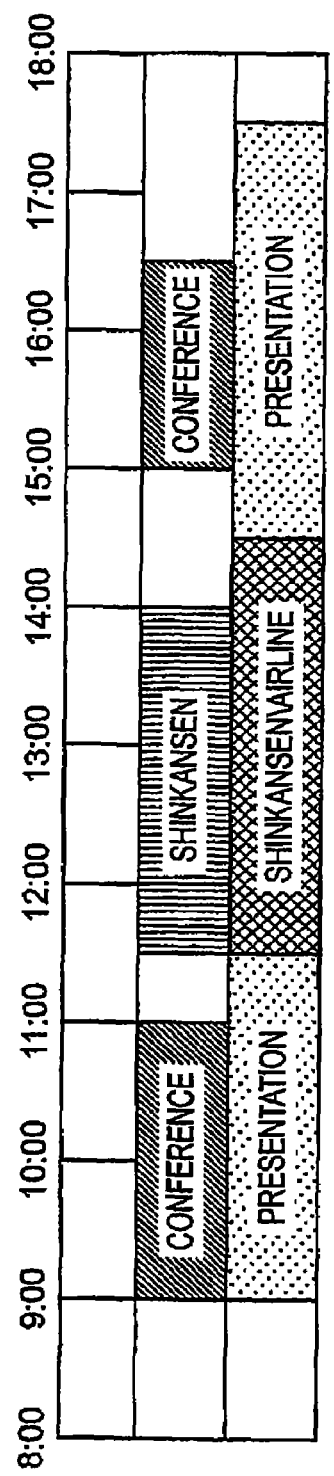
FIG. 10 is a diagram showing a changeover example of profiles of an information processing apparatus in preferred embodiment 2 of the invention.

Another example of a method for changing profiles is explained. In the method for changing profiles in this preferred embodiment, when changed to a further new profile before reaching the continuation time specified by the user, if passing the new continuation time for the new profile, instead of the default profile, the profile is returned to the profile already determined immediately before the change. This operation is explained below while referring to FIG. 10 and FIG. 11. FIG. 10 is a diagram for explaining an example of profile changeover in this preferred embodiment, and FIG. 11 and FIG. 12 are flowcharts showing the operating procedure of the information processing apparatus 100 at this time.

Figure 11:
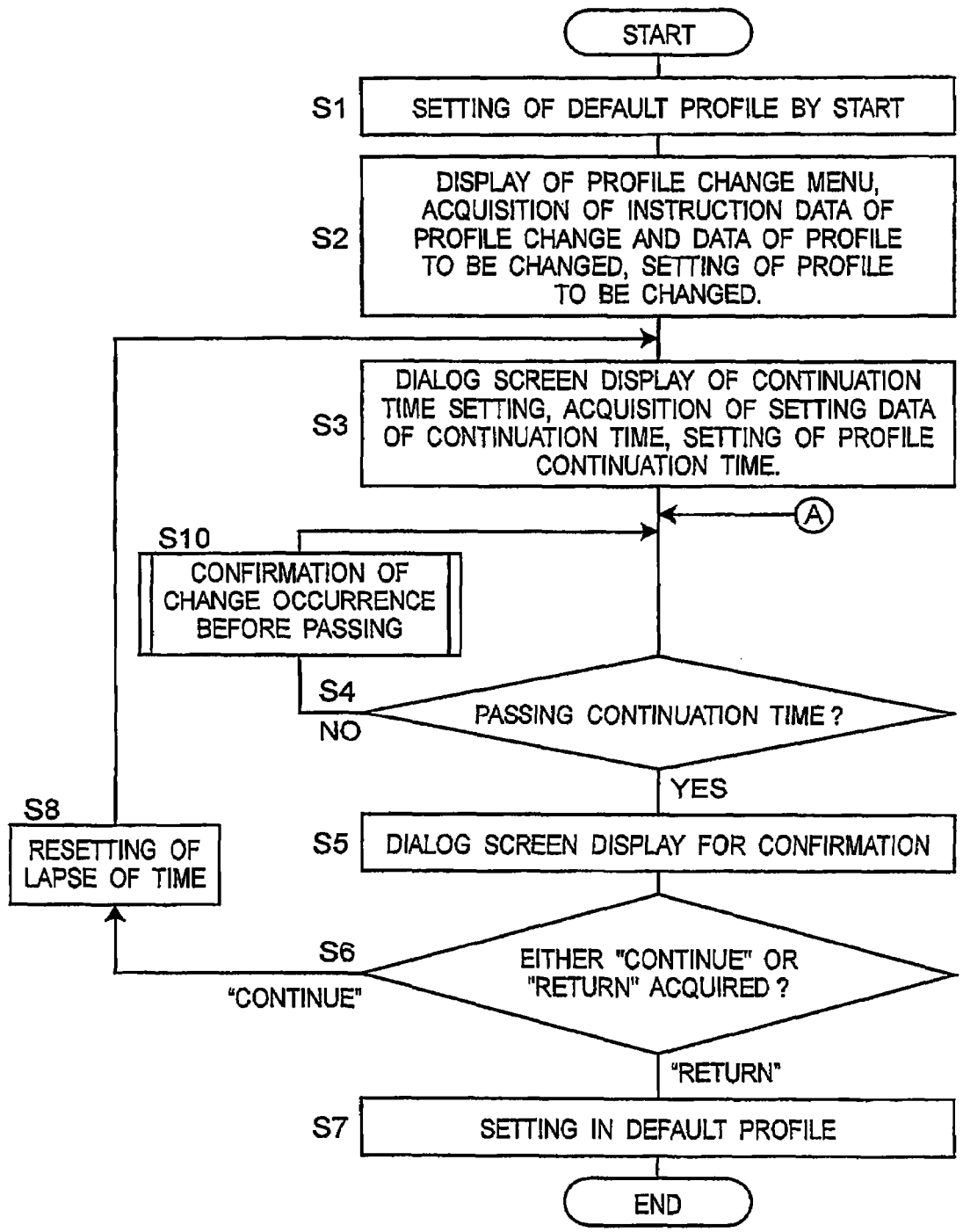
FIG. 11 is a flowchart of operating procedure of the information processing apparatus in preferred embodiment 2 of the invention.
Figure 12:
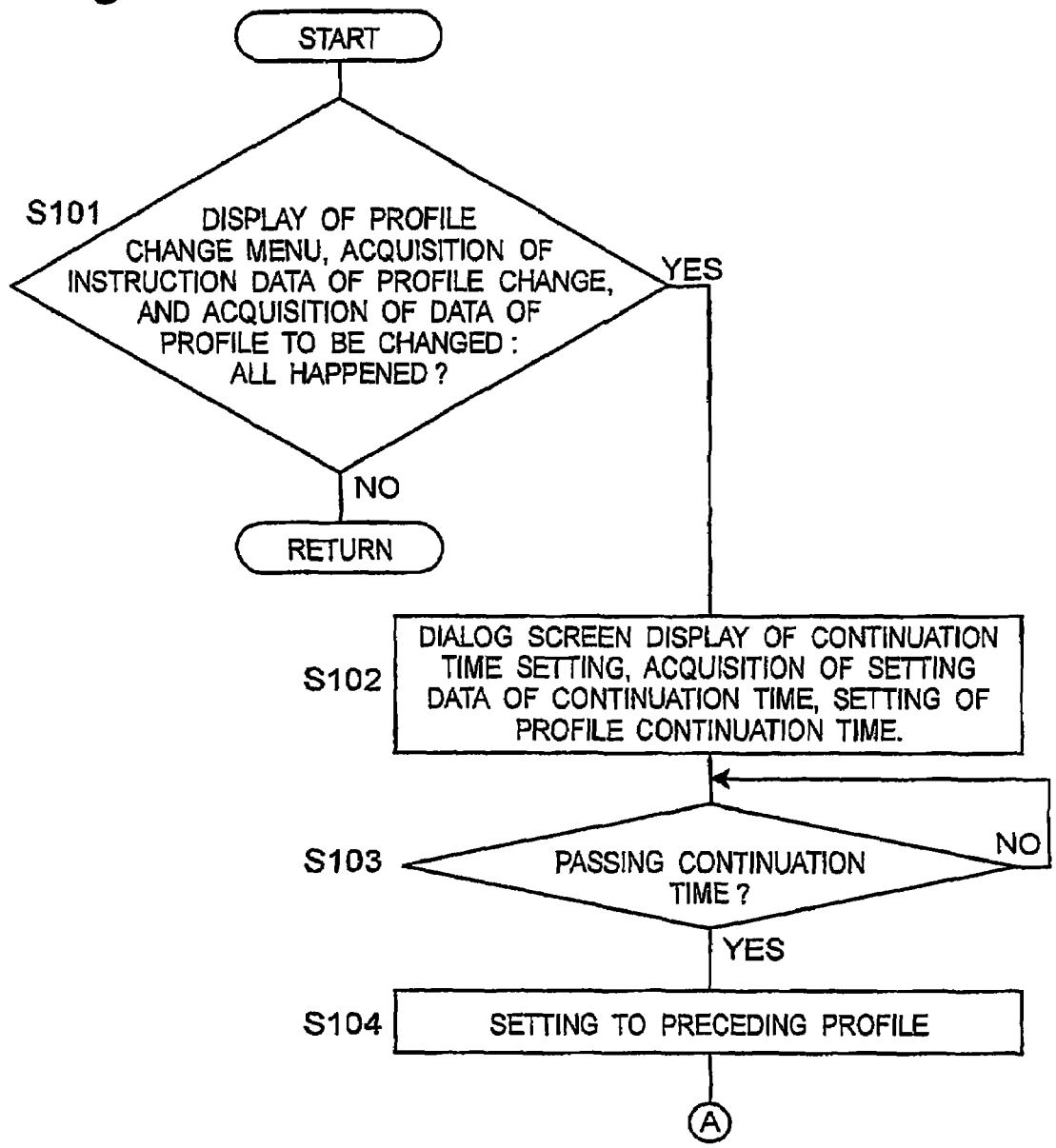
FIG. 12 is a flowchart of operating procedure of confirmation routine of occurrence of change before passing of the information processing apparatus in preferred embodiment 2 of the invention.

The flowchart in FIG. 11 relating to the preferred embodiment is nearly same as the flowchart shown in FIG. 7 relating to preferred embodiment 1. However, in the flowchart in FIG. 11, step S10 comes right after branching of No at step S4 after confirming of not-passing of continuation time. That is, step S10 is a routine step of confirming occurrence or no occurrence of the event of changing the profile to a further new one before passing of the continuation time of the set profile. Besides, the routine in step S10 also has a function of monitoring the passing time of a new profile, and controlling to return to the immediately preceding profile, if the profile is further changed. FIG. 12 is a flowchart of the confirmation routine of change occurrence before passing in step S10.

It is assumed as follows: a conference is held in Osaka from 9:00 to 11:00, and a move occurs from Osaka to Tokyo by shinkansen from 11:30 to 14:00, and another conference is started in Tokyo from 15:00, immediately after the arrival (see FIG. 10).

Suppose the default setting of the profile is "ordinary". When the information processing apparatus 100 is started, the system environment is first set to "ordinary" profile of default setting (S1). Immediately before the conference begins at 9:00, if the user starts the profile change utility, the profile changeover menu 15 is displayed. On the profile changeover menu 15, the user changes and sets the utilization plan (profile) to "presentation" according to the procedure mentioned above (S2), and the continuation time (3 hours) of the profile is set on the profile screen 20 (S3). At this time, the profile changeover section 214 reads out the system environment setting data corresponding to the "presentation" profile from the DB 230, sends the data out to the system environment setting control section 213, and the system environment setting control section 213 controls the system environment of the related device by way of the OS 200 and the BIOS/EC 220.

Consequently, the user is on board a shin en at 11:30 before the lapse of continuation time (3 hours). Immediately before the boarding the shinkansen, the user further displays the profile changeover menu, and provides the user interface section 212 with the data showing an instruction of profile changeover, and the data about making further change in which profile. The confirmation routine of change occurrence before passing in step S10 is always monitoring whether such an event, "display of profile changeover menu, acquisition of instruction data of profile change, or acquisition of data relating to the profile name after change" (hereinafter called "event of change occurrence before passing") has occurred before passing of the continuation time specified at step S3 or not (S10, and S101 in FIG. 12). That is, as far as the event of change occurrence before passing does not occur, "No at step S101" and "Return" in FIG. 12, and judging about passing of continuation time (at step S4 in FIG. 11) are repeated, but when such event of change occurrence before passing occurs ("Yes at step S101" in FIG. 12), monitoring the lapse of time of new profile and controlling to return to the immediately preceding profile, as shown in FIG. 1, shall be done.

In FIG. 10, the profile is changed to "shinkansen/airline" (Yes at S101 in FIG. 12). The new continuation time of the newly set profile is set at 3 hours (S102). At this time, the profile changeover section 214 reads out the system environment setting data corresponding to the "shinkansen/airline" profile from the DB 230, and sends the data out to the system environment setting control section 213, and the system environment setting control section 213 controls the system environment of the related device by way of the OS 200 and the BIOS/EC 220.

Then the shinkansen arrives at Tokyo. When the new continuation time (3 hours) passes over (Yes at step S103) wile moving to the conference room, the profile changeover section 214 returns to the previous setting of "presentation" profile (S104). More specifically, the profile changeover section 214 reads out the system environment setting data corresponding to the "presentation" profile from the DB 230, and transmits the data to the system environment setting control section 213. The system environment setting control section 213 controls the system environment of the related device by way of the OS 200 and the BIOS/EC220 according to the received system environment setting data.

After the profile changeover section 214 returns the setting of the profile, the process returns to the flowchart in FIG. 11. The returning destination in the flowchart in FIG. 11 is immediately after step S3 (position indicated by "A" in FIG. 11). In the flowchart in FIG. 11, the process is resumed from the judging step (S4) of passing about the continuation time determined at step S3 on the profile determined immediately before change.

As described herein, according to this preferred embodiment, if changed to a new profile before passing of the continuation time, instead of the default profile ("ordinary" profile in this example), the profile is returned to the profile being determined before change ("presentation" profile in the example). By this configuration, if the conference is started immediately, the information processing apparatus 100 can be used as is in this state.

INDUSTRIAL APPLICABILITY

The invention can be applied widely not only in portable type notebook computers, but also in information processing apparatus used by changing over plural system environments.

What is claimed is:

1. An apparatus for processing information comprising:
a storage configured to store a plurality of profiles, including data for setting a system environment,
an inputter configured to input a changeover instruction of a profile, and a continuation time of the profile, by a user,
a profile changer configured to read the profile from the storage, and to set the system environment by using the read profile according to the profile changeover instruction, and
a timer configured to count a time from the setting of the system environment by the profile changer,
wherein the profile changer reads a default profile, which is a profile preliminarily determined as a profile for resetting, from the storage, when the time has reached the continuation time of the profile received through the inputter, and sets the system environment anew by using the read default profile, wherein, before the time reaches the continuation time of the profile received through the inputter, when the inputter receives a changeover instruction of a new profile, and a continuation time of the new profile, the profile changer reads the new profile from the storage on the basis of the changeover instruction of the new profile, and changes and sets the system environment by using the new profile, and the timer starts counting a second time after being changed to the new profile by the profile changer and before the time reaches the continuation time of the profile received through the inputter, and when the second time reaches the continuation time of the new profile received through the inputter, the profile changer reads the profile before the new profile from the storage, and sets the system environment anew by using the profile before the new profile, wherein it is determined whether or not the time reaches the continuation time of the profile received through the inputter, and when it is determined that the time has not reached the continuation time of the profile, and the inputter receives the changeover instruction of the new profile, the profile changer reads the new profile from the storage on the basis of the changeover instruction of the new profile.

2. The apparatus for processing information of claim 1, further comprising:
a default profile changer configured to change the default profile,
wherein the inputter receives a change instruction of the default profile, and the default profile changer changes the default profile according to the change instruction of the default profile.

3. The apparatus for processing information of claim 2, wherein, immediately after the inputter receives the continuation time of the profile to be changed, the default profile changer receives the change instruction of the default profile.

4. The apparatus for processing information of claim 1, wherein the profile is determined in each utilization scene, and the default profile is selected from the profiles corresponding to the utilization scenes.

5. The apparatus for processing information of claim 1, wherein a different continuation time can be received for each profile.

6. The apparatus for processing information of claim 1, further comprising:
a selective inputter configured to receive data indicating whether the setting of the profile is further continued, or the system environment is set back to the default profile, when the time has reached the continuation time of the profile received through the inputter,
wherein when the time has reached the continuation time, if the data received in the selective inputter indicates that the setting of the profile is to be further continued, the inputter receives a new continuation time of the profile, and the timer resets the time, and newly starts counting the time, and
if the data received in the selective inputter indicates that the system environment is set back to the default profile, the profile changer reads the default profile from the storage, and sets the system environment anew by using the default profile.

7. The apparatus for processing information of claim 6, further comprising:
a change inputter configured to specify the default profile based on data selected from the plurality of profiles, if the selective inputter receives the data indicating that the system environment is set back to the default profile,
wherein, when the time has reached the continuation time, if the data received in the selective inputter indicates that the setting of the profile is to be further continued, the inputter receives the new continuation time of the profile, and the timer resets the time, and newly starts counting the time, and if the data received in the selective inputter indicates that the system environment is set back to the default profile, the profile changer reads the default profile specified by the change inputter from the storage, and sets the system environment anew by using the default profile.

8. The apparatus for processing information of claim 1, further comprising:

a selective inputter configured to receive data indicating whether the setting of the profile is further continued, or the system environment is set back to the default profile, when the time has reached the continuation time of the profile received through the inputter, wherein, when the time has reached the continuation time, if the data received in the selective inputter indicates that the setting of the profile is to be further continued, the profile changer continues the setting of the profile, and if the data received in the selective inputter indicates that the system environment is set back to the default profile, the profile changer reads the default profile from the storage, and sets the system environment anew by using the default profile.

9. An apparatus for processing information comprising:

a storage configured to store a plurality of profiles, including data for setting a system environment, an inputter configured to receive a changeover instruction of a profile, and a continuation time of the profile by a user, a profile changer configured to read the profile from the storage, and to set the system environment by using the read profile according to the profile changeover instruction, and a timer configured to count a time from the setting of the system environment by the profile changer, wherein the profile changer reads a previous profile before the present profile, from the storage, when the time has reached the continuation time of the profile received through the inputter, and sets the system environment anew by using the previous profile, wherein, before the time reaches the continuation time of the profile received through the inputter, when the inputter receives a changeover instruction of a new profile, and a continuation time of the new profile, the profile changer reads the new profile from the storage on the basis of the changeover instruction of the new profile, and changes and sets the system environment by using the new profile, and the timer starts counting a second time after being changed to the new profile by the profile changer and before the time reaches the continuation time of the profile received through the inputter, and when the second time reaches the continuation time of the new profile received through the inputter, the profile changer reads the profile before the new profile from the storage, and sets the system environment anew by using the profile before the new profile, wherein it is determined whether or not the time reaches the continuation time of the profile received through the inputter, and when it is determined that the time has not reached the continuation time of the profile, and the inputter receives the changeover instruction of the new profile, the profile changer reads the new profile from the storage on the basis of the changeover instruction of the new profile.

10. A computer-implemented method for setting a system environment of an apparatus for processing information for setting the system environment, by storing a plurality of profiles, including data for setting the system environment, and reading the profiles, the method comprising:

receiving a profile changeover instruction indicating a changeover of a profile, and data indicating a continuation time of the profile, reading the profile, and setting the system environment by using the read profile according to the profile changeover instruction, and counting a time from the setting of the system environment;

reading a default profile, which is a profile preliminarily determined as a profile for resetting, from the plurality of stored profiles, when the time has reached the continuation time of the profile, and setting the system environment anew by using the read default profile, before the time reaches the continuation time of the profile, receiving a changeover instruction of a new profile, and a continuation time of the new profile, reading the new profile from the plurality of stored profiles on the basis of the changeover instruction of the new profile, changing and setting the system environment by using the read new profile, and starting counting a second time after being changed to the new profile and before the time reaches the received continuation time of the profile, and when the second time reaches the continuation time of the new profile, reading the profile before the new profile from the plurality of stored profiles, and setting anew the system environment by using the profile, the method further comprising determining whether or not the time reaches the continuation time of the profile, wherein when it is determined that the time has not reached the continuation time of the profile, and the changeover instruction of the new profile is received, the new profile is read from the plurality of stored profiles on the basis of the changeover instruction of the new profile.

11. The apparatus according to claim 1, wherein when it is determined that the time has reached the continuation time of the profile, it is determined whether the profile continues or the default profile is used, and when it is determined that the profile continues, a new continuation time of the profile is set.

12. The apparatus according to claim 9, wherein when it is determined that the time has reached the continuation time of the profile, it is determined whether the profile continues or the default profile is used, and when it is determined that the profile continues, a new continuation time of the profile is set.

13. The method according to claim 11, wherein when it is determined that the time has reached the continuation time of the profile, it is determined whether the profile continues or the default profile is used, and when it is determined that the profile continues, a new continuation time of the profile is set.

* * * * *